United States Patent [19]

D'Sidocky et al.

[11] Patent Number: 4,579,911

[45] Date of Patent: Apr. 1, 1986

[54] POLYMER BOUND NONIONIC SURFACTANTS AS CURE ACTIVATORS

[75] Inventors: Richard M. D'Sidocky, Ravenna; Kirkwood S. Cottman, Akron; Joseph F. Geiser, Uniontown; Paul H. Sandstrom, Tallmadge; Robert A. Smith, Uniontown, all of Ohio

[73] Assignee: The Goodyear Tire & Rubber Company, Akron, Ohio

[21] Appl. No.: 740,156

[22] Filed: Jun. 3, 1985

[51] Int. Cl.$^4$ .................................................. C08L 9/00
[52] U.S. Cl. .................................... 525/223; 525/212; 525/215; 525/218; 526/287; 526/304; 526/313; 526/320
[58] Field of Search ............... 526/287, 288, 304, 312, 526/313, 320; 525/223

[56] References Cited

U.S. PATENT DOCUMENTS

| | | | |
|---|---|---|---|
| 4,105,649 | 8/1978 | Evani | 526/287 |
| 4,200,563 | 4/1980 | Komiya | 526/320 |
| 4,384,096 | 5/1983 | Sonnabend | 526/313 |
| 4,395,524 | 7/1983 | Emmons | 526/304 |
| 4,421,902 | 12/1983 | Chang | 526/320 |
| 4,464,524 | 8/1984 | Karickhoff | 526/313 |
| 4,495,243 | 1/1985 | Kishi | 526/312 |

*Primary Examiner*—Paul R. Michl
*Attorney, Agent, or Firm*—D. O. Nickey

[57] ABSTRACT

There are disclosed polymers which have nonionic surfactant moieties pendant to the polymeric backbone which exhibit activated sulfur vulcanization, a process for their preparation, and mixtures of polymeric cure activators and elastomers.

9 Claims, No Drawings

POLYMER BOUND NONIONIC SURFACTANTS AS CURE ACTIVATORS

TECHNICAL FIELD

This invention relates to polymers which have chemically attached to the polymeric backbone a nonionic surfactant moiety, more specifically, a polyethoxylated pendant group. These polymers, when cured with sulfur or in combination with conventionally sulfur curable rubber stocks, exhibit increased cure rates without adversely impacting on other physical properties. The polymeric cure activators, according to this invention, exhibit cure reduction times of from 15 to almost 40 percent.

BACKGROUND ART

There are many known techniques for adding vulcanization accelerators to rubber so as to shorten the vulcanization time, lower the vulcanization temperature, improve various characteristics of the vulcanized rubber article and to improve the handling ability of the rubber during processing.

Vulcanization, or curing, is a term applied to the process where elastomers, natural and synthetic, are treated with certain chemicals to improve their strength and durability. In general, vulcanization will effect the following changes in raw elastomers: increase tensile strength, eliminate tackiness, decrease solubility in various solvents, increase elasticity and decrease temperature sensitivity. These improved properties can be obtained by treating the raw elastomer with sulfur in the presence of other chemicals such as accelerators. It is known that the presence of accelerators in the vulcanization process is desirable since accelerators enable the vulcanization reaction to be carried out in a shorter period of time and at a lower temperature. In some cases, vulcanization can be effected at room temperature, and the amount of sulfur may be reduced when an accelerator is incorporated into the vulcanization mixture.

If large amounts of accelerators are used in the vulcanization process, the resulting composition contains appreciable amounts of the accelerator or decomposition products thereof. Although the presence of appreciable amounts of accelerators in the final composition is not usually detrimental, there are applications where the presence of the accelerator is undesirable, for example, accelerators such as the thiazoles, are skin irritants. Thus, consideration of the amount and type of accelerator present in the vulcanized composition is important where the vulcanized composition is to be used in the preparation of fabrics and articles which may come in contact with the skin.

Vulcanization accelerators presently used in the industry also present other problems. For example, dithioacid salts such as dithiocarbamates or thiurams, so called "ultra accelerators", rapidly accelerate vulcanization at conventional vulcanization temperatures but have the problem of permaturely vulcanizing the rubber compositions during processing steps such as mixing or molding due to the heat generated by their own activity, resulting in undesired scorching of the rubber. Sulfenamides, so called "delayed action accelerators", do not possess scorching problems, but they tend to retard the rate of vulcanization.

Accordingly, it has become important in the rubber industry to find novel accelerator systems that prevent scorching of the rubber at processing temperatures, but that allow vulcanization to take place rapidly at vulcanization temperatures and to provide final compositions which do not have accelerators bloom, or come to the surface, of the rubber article.

U.S. Pat. No. 3,989,643 discloses zinc oxide and fatty acids commonly employed as accelerator activators added to the rubber in the form of a dispersion of the zinc salt of the fatty acid in an alkylphenoxy polyglycol. U.S. Pat. No. 3,989,643 teaches that such an activator system improves compounding, and mixing is completed in a shorter time and at lower mixing temperatures than when zinc oxide and fatty acid are added separately. U.S. Pat. No. 3,989,643 does not suggest or disclose that polyethoxylated moieties can be chemically bound to a polymeric material and continue to evidence enhanced cure rates.

Canadian Pat. No. 900,649 teaches that copolymers of tetrafluoroethylene and certain α-olefins or alkylvinyl ethers can be provided with optimum cure rates by copolymerizing them with from 0.5 to 5 percent by weight of an aryloxyalkylvinyl ether monomer. This patent teaches that acid cures can be enhanced through the use of such tetrafluoroethylene polymers.

Daiichi, Chem. Abs. 95:188996T discloses that nonionic surfactants having hydroxyl groups can be reacted with α,β-unsaturated monocarboxylic acids in the presence of $H_2SO_4$ to prepare polymerizable surfactants.

A Russian reference by A. G. Fomin et al, International Polymer Science & Technology, 8(7) T 54 (1980) teaches the use of carbowax polyethyleneglycols to increase cure rates in NBR.

The prior art does not suggest or disclose that polymer bound nonionic surfactants will activate sulfur cure rates and provide other benefits over the nonbound species. Further, the art does not suggest or disclose the enhanced cure rates that can be achieved for styrene/butadiene rubbers through the use of a polymeric cure activator.

DISCLOSURE OF THE INVENTION

There is disclosed a vulcanizable rubber composition comprising rubber, a vulcanizing agent and a polymeric cure activator, wherein said polymeric cure activator is prepared in a free radical emulsion polymerization wherein at least one polyethoxylated monomer of the following structural Formula I:

$$\alpha-O-CH_2-CH_2-O)_n\beta \qquad \text{Formula I}$$

wherein α is a radical selected from the group comprising:

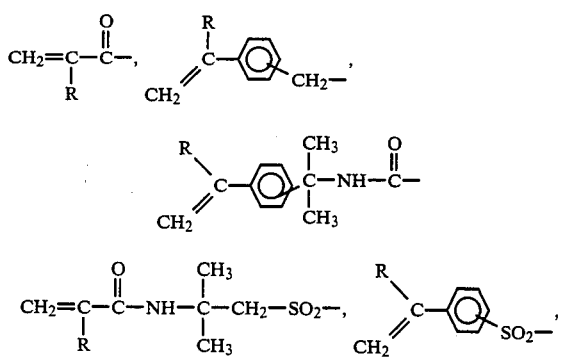

-continued

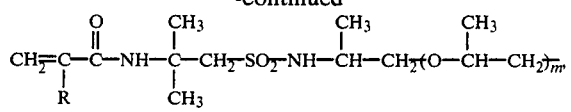

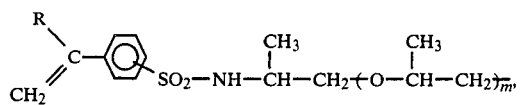

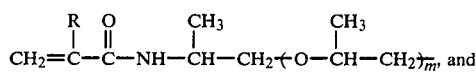

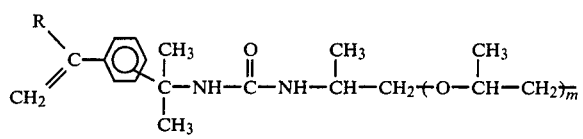

wherein R may be methyl or hydrogen;
n may vary from 2 to 30;
m may vary from 1 to 10 with the proviso that n is always greater than m;
and wherein $\beta$ is selected from the group comprising:

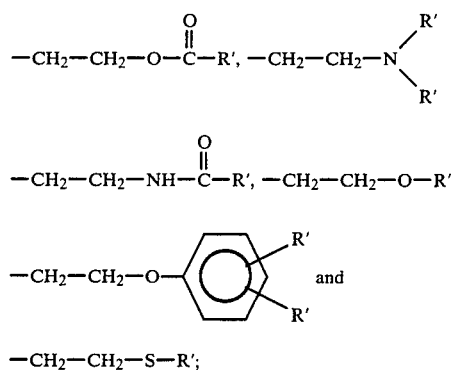

wherein R' is an alkyl radical of 1-20 carbon atoms or hydrogen;
is polymerized with at least one co-monomer selected from the group comprising sytrene, $\alpha$-methylstyrene, butadiene, isoprene, methylbutadiene, dimethylbutadiene, pentadiene and chloroprene;
is homopolymerized or
is polymerized with a vinyl aromatic monomer selected from the group consisting of styrene and $\alpha$-methylstyrene; and a diolefin monomer selected from the group consisting of: butadiene, isoprene, methylbutadiene, dimethylbutadiene, pentadiene and chloroprene;
wherein the monomer charge weight ratio of polyethoxylated monomer can range from 1 to 99 parts per hundred monomer, vinyl aromatic monomer can range from 0 to 99 pphm, and diolefin monomer can range from 0 to 99 pphm.

There is also disclosed a vulcanizable rubber composition comprising rubber, a vulcanizing agent and a polymeric cure activator, said polymeric cure activator consisting essentially of segmeric units a portion of said units consisting of at least one of the cure activating segmeric entities selected from the group consisting of polyethoxylated segmeric units having the structural formula:

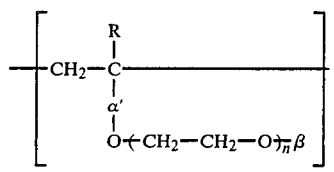

wherein $\alpha'$ is a divalent radical selected from the group consisting of:

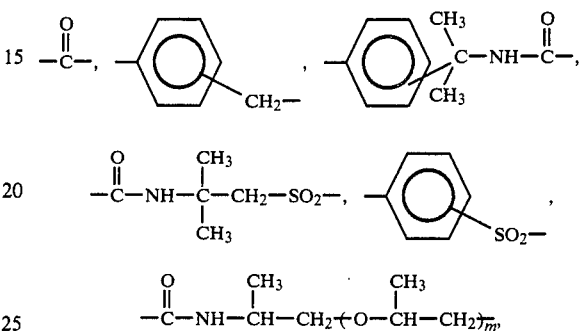

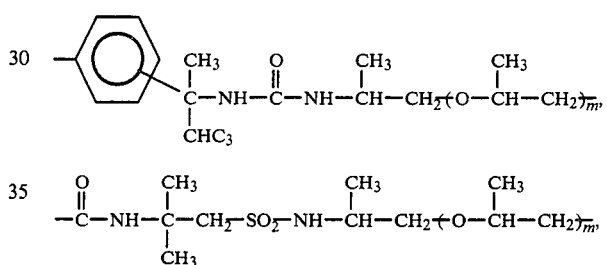

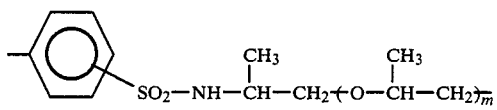

wherein R may be a hydrogen or a methyl radical;
n may vary from 2 to 30;
m may vary from 1 to 10 with the proviso that n is always greater than m; and
$\beta$ is selected from the group consisting of

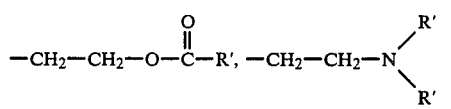

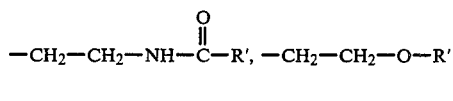

wherein R' is an alkyl radical of 1-20 carbon atoms or hydrogen.

There is also disclosed a polymer represented by the structural formula:

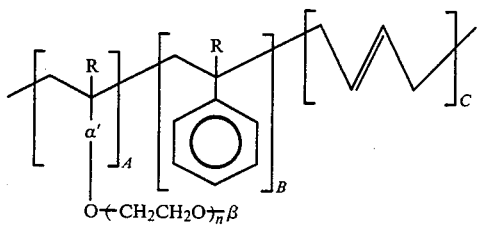

There is disclosed a process of preparing a cure activating polymeric composition comprising polymerizing in a free radical polymerization system, a monomer system containing at least one polyethoxylated monomer having the structural formula I:

$$\alpha-O-CH_2-CH_2-O)_n\beta \qquad (I)$$

wherein $\alpha$ is a radical selected from the group consisting of:

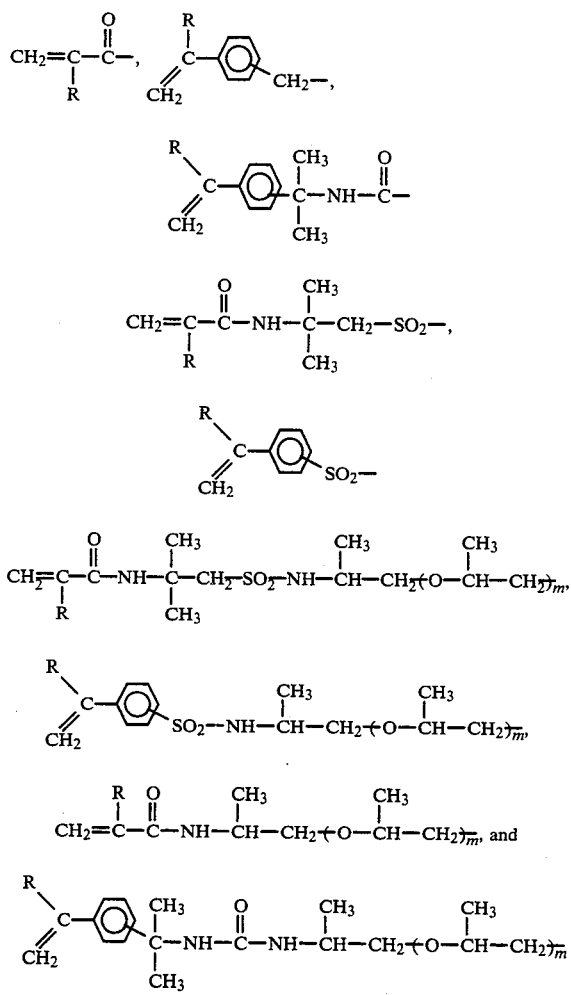

wherein R may be methyl or hydrogen;
n may vary from 2 to 30; and wherein
$\beta$ is selected from the group consisting of:

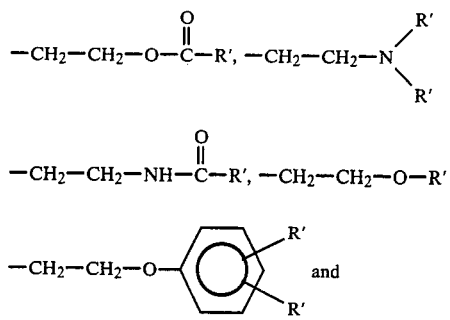

$-CH_2-CH_2-S-R'$;

wherein R' is an alkyl radical of 1–20 carbon atoms or hydrogen;
n may vary from 2 to 30;
m may vary from 1 to 10 with the proviso that n is always greater than m.

The modified or functionalized polymers of this invention which contain a pendant polyethoxylated moiety have demonstrated enhanced rates of sulfur vulcanization and improved adhesion to fabric reinforcement. In addition, these functionalized polymers, when blended with rubbers or blends of rubber, exhibited increased cure rates. One skilled in this art will appreciate that compatibility is required between the functionalized polymer and the rubber it is blended with. For example, a 40/60 polyethoxylated/butadiene copolymer would be compatible with polybutadiene and would evidence activated cure. However, a 40/60 polyethoxylated/styrene copolymer would not be compatible with polybutadiene. This factor of compatibility is known to those skilled in this art, and as such, is contemplated herein. Thus, the polymeric cure activators of this invention will impart activated cure and enhanced fabric adhesion to rubber mixtures when blended with compatible, conventional rubber stocks.

The term "rubber" as used herein embraces both natural rubber and all its various raw and reclaim forms as well as various synthetic rubbers, i.e. rubber polymers of the type which may be vulcanized with sulfur. Representative synthetic polymers are the homopolymerization products of butadiene and its homologues and derivatives, as for example, methylbutadiene, dimethylbutadiene, pentadiene and chloroprene (neoprene synthetic rubber), as well as copolymers such as those formed from butadiene or its homologues or derivatives with other unsaturated organic compounds. Among the latter are acetylenes, e.g. vinyl acetylene; olefins, for example, isobutylene, which copolymerizes with isoprene to form butyl rubber; vinyl compounds, for example, vinylchloride, acrylic acid, acrylonitrile (which polymerizes with butadiene to form buna-N rubber), methacrylic acid and styrene, the latter compound polymerizing with butadiene to form buna-S rubber, as well as vinyl esters and various unsaturated aldehydes, ketones and ethers, e.g. acrolein, methylisopropyl ketone and vinylethyl ether. Also included are the various synthetic rubbers prepared from the homopolymerization of isoprene and the copolymerization of isoprene with other diolefins and various unsaturated organic compounds. Additionally included are the synthetic rubbers such as 1,4-cis polybutadiene and 1,4-cis polyisoprene and similar synthetic rubbers which have been developed in recent years, such as EPDM. Such recently developed rubbers include those that have polymer bound functionality such as antioxidants and antiozonants. These polymer bound materials are known in the art and can have functionalities that provide antidegradative properties, synergism, and other properties. Polymer bound functions (as in this invention) have great value since the pendant functionality possessing the desired activity cannot be extracted (or migrate) since it is chemically attached to the backbone of the polymer.

The preferred rubbers to be blended with the functionalized polymers of the instant invention are styrene/butadiene copolymers, polybutadiene and polyisoprene. It must be remembered that for the polymeric cure activator to be effective it must be blended with a rubber that it is compatible with.

It should be appreciated that the scope of the instant invention includes the polymeric vulcanization activator itself (masterbatch), a polymer blend which contains a minor amount of such masterbatch polymer and a polymer that contains a minor amount of the bound non-ionic surfactant moiety. These compositions exhibit accelerated sulfur vulcanization and enhanced adhesion to fabric reinforcement. Polymers containing high levels of incorporated polyethoxylated monomer, as previously described, may be used as a masterbatch, or homopolymers of the polyethoxylated monomer may be used, depending on compatibility. Such masterbatch polymers may be blended with compatible, conventional stocks (such as styrene/butadiene copolymers) to result in a blend that contains from 0.1 to 10 percent by weight of the polyethoxylated functionality. It should be appreciated that masterbatching would eliminate the need for modification of large scale polymerizations and thus eliminate the problems attendant to the introduction of an additional monomer in the preparation of commercial scale rubbers.

The polymeric cure activators of the present invention can be used with any conventional compounding additives such as carbon black, zinc oxide, antidegradants and stearic acid. For the purposes of this invention, "sulfur vulcanizing agent" means elemental sulfur or sulfur donating vulcanizing agents, for example, an amine disulfide or a polymeric polysulfide. Preferably, the activators of this invention are used with free sulfur. The invention is applicable to various classes and conventional amounts of vulcanization agents.

The following examples illustrate the preparation of various polymeric vulcanization accelerators of the present invention and are not intended to limit the scope of the present invention. All parts are by weight unless otherwise noted.

In general, the monomers of this invention are readily prepared by reacting with or without the aid of a catalyst, the α portion of the molecule, such as methylmethacrylate, vinylbenzylchloride, methacryloylchloride, m- or p-isopropenyldimethylbenzyl isocyanate, isopropenylbenzene sulfonyl chloride and to such; with the β portion which contains the polyethylene oxide group. Representative of the compounds that provide the β portion of the molecule and the polyethylene oxide portion are Igepal TM such as 660 and the Jeffamine TM M-series from the Texaco Chemical Company. It should be appreciated that compounds such as the Jeffamine TM series that contain a polyethylene oxide portion and a polypropylene oxide portion, that there should always be more ethylene oxide units than propylene oxide units.

EXPERIMENT 1

Preparation of SBR Containing Bound Polyether Via Grafting

In addition to the polymerization of polyethoxylated monomers, polymers may be prepared that contain the pendant polyethoxylated functionality via the grafting method. This method is demonstrated in the following experiment.

151 gms of Igepal TM CO 660, a polyalkyl ether of the structural formula:

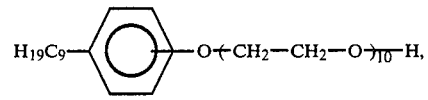

900 mls of toluene, 23.5 gms of powdered anhydrous $K_2CO_3$, 41.6 gms of powdered NaOH and 12 gms of tetrabutyl ammonium sulfate were added to a reaction flask placed under nitrogen and reacted at 60° C. overnight. To the above reaction mixture was added 1,163 gms of an 8.6% by weight toluene cement of SBR (19 parts styrene and 77 parts butadiene) containing 4% vinylbenzylchloride (0.9% chlorine). This was reacted seven hours under nitrogen at 60° C. 4.3 parts of an antioxidant [a 35/65 copolymer of N-(4-anilinophenyl)-methacrylamide and butadiene] was dissovled in toluene and added to the cement to result in 1.5 parts N-(4-anilinophenyl)methacrylamide by weight. The polymer bound antioxidant was added before the mixture was filtered and coagulated by addition to isopropyl alcohol. The crumbs were extracted two days with hot acetone (thus requiring the bound antioxidant), and elemental analysis of the dry crumbs showed less than 0.03% chlorine remaining. Infrared analysis showed a strong COC band at 1,100 cm$^{-1}$. The modified SBR of this experiment contained 14 parts/100 parts by weight of rubber of the polyalkyl ether bound to the polymeric backbone. It is theorized that the final polymer has the structure:

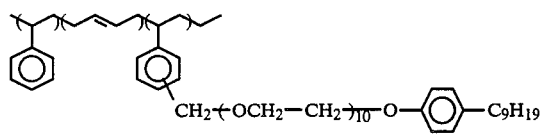

This method of grafting the polyethoxylated functionality to the polymer can also be accomplished in the solid state by mixing the polyalkylether with the rubber.

Sulfur cure characteristics of the gum stock were examined according to the procedure set out in the Vanderbilt Rubber Handbook, edited by R. O. Babbit (1978). It was unexpectedly found that the modified (functionalized) SBR showed a 74% reduction in cure times compared to an SBR control (no bound polyethoxylated functionality and no vinylbenzylchloride) and a reduction of 78% compared to the SBR containing 4% vinylbenzylchloride. A $T_{90\%}$ of 38 minutes was observed for the control; a $T_{90\%}$ of 46 minutes for the SBR containing 4% vinylbenzylchloride; and a $T_{90\%}$ of 10 minutes for the SBR with grafted polyethoxylated functionality. See Table I. This data clearly indicates that the bound polyethoxylated functionality significantly increases the rate of sulfur vulcanization and would thus reduce energy requirements and cycle times for curing of rubber articles.

TABLE I

| Test Cpd. | Cure Data at 149° C. | | |
|---|---|---|---|
| | Grafted Cure Activator Experimental | Control | 4% VBC* Containing Control |
| $M_{HF}$ in N.m | 6.3 | 5.3 | 6.0 |
| $M_L$ in N.m | 1.1 | 0.8 | 0.8 |
| Δ Torque in N.m | 5.2 | 4.5 | 5.2 |
| $T_{90}$, mins. | 10 | 38 | 46 |
| $T_{25}$, mins. | 7.75 | 25 | 22.5 |
| Δ $T_2$, mins. | 6.25 | 18.5 | 17.5 |

*VBC = vinylbenzylchloride

EXPERIMENT 2

Preparation of Functionalized Monomers

I. Preparation of nonylphenoxypoly(ethyleneoxy)ethyl vinylbenzyl ether of the structural formula:

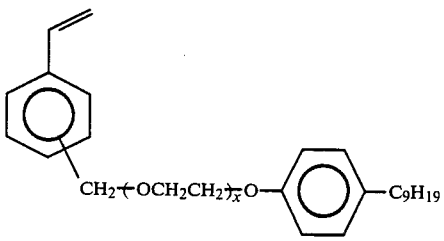

To a one liter flask was added 0.16 moles nonylphenoxypoly(ethyleneoxy)ethanol, 0.65 moles powdered NaOH, 0.107 moles powdered $K_2CO_3$, 0.0015 moles tetrabutyl ammonium hydrogen sulfate and 250 ml toluene. The mixture was heated overnight at 60° C., cooled to 40° C. and 0.2 moles of vinylbenzylchloride, in 50 ml of toluene was added. The mixture was reheated to 60° C. and reacted for 7 hours, cooled, filtered, and excess vinylbenzyl chloride removed by aqueous azeotrope stripping.

II. Preparation of nonylphenoxypoly(ethyleneoxy)ethyl methacrylate of the formula:

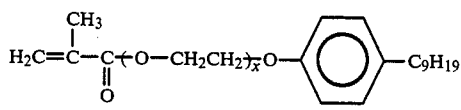

0.76 moles nonylphenoxypoly(ethyleneoxy)ethanol and 0.83 moles of triethylamine were dissolved in 1500 ml dry tetrahydrofuran and 0.83 moles methacryloyl chloride was slowly added to the solution while maintaining a reaction temperature of 32° C. At the end of the reaction, methanol was added to consume unreacted methacryloyl chloride, reaction salts removed by filtration and the reaction solvent removed by stripping.

III. Preparation of m-isopropenyldimethylbenzyl nonylphenoxypoly(ethyleneoxy)ethyl urethane of the formula:

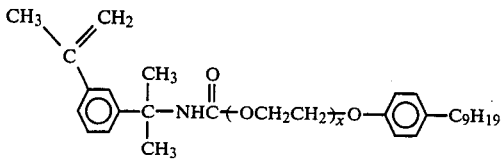

0.053 moles of m-isopropenyldimethylbenzyl isocyanate, 0.053 moles nonylphenoxypoly(ethyleneoxy)ethanol (Igepal TM 660) and 0.15 weight percent dibutyltindilaurate were reacted at room temperature until no isocyanate function was detectable by IR (NCO stretch at 2250 cm$^{-1}$).

IV. Preparation of isopropenylbenzene nonylphenoxypoly(ethyleneoxy)ethyl sulfonate of the formula:

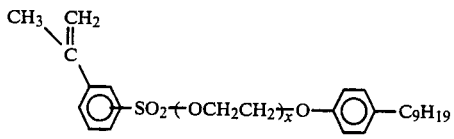

One mole of isopropenylbenzene sulfonyl chloride is reacted with 1 mole of nonylphenoxypoly(ethyleneoxy)ethanol in the presence of a hydrogen chloride acceptor. The salts are removed by filtration.

V. Preparation of m-isopropenyldimethylbenzyl isocyanate adduct with Jeffamine TM M-1000 of the representative formula:

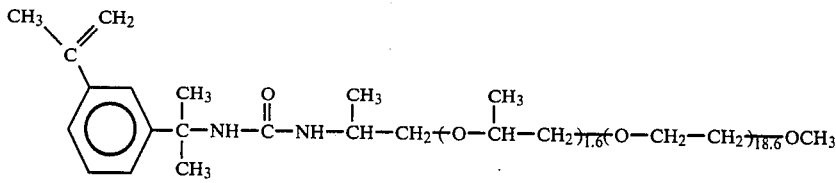

0.25 mole of Jeffamine TM M-1000 obtained from the Texaco Chemical Company, 200 mls toluene, and 200 ml THF are charged to a reaction vessel equipped with a thermometer, condenser and stirrer. 0.25 ml of m-isopropenyldimethylbenzyl isocyanate is added slowly at a temperature below 40° C. The reaction is followed by IR until the reaction is complete. The solvent is then distilled off to isolate the product.

Various polyethoxylated monomers prepared in a manner similar to that described above were examined as to their copolymerizability with styrene and butadiene in emulsion polymerizations. Polymerizations were conducted in bottles equipped with a spin bar using a standard SBR emulsion recipe. The bottles were thermostatted by placing them in a large metal beaker containing water which was cooled to the desired temperature by the addition of ice.

Latices were coagulated by pouring into acidified methanol. The samples were dried overnight under vacuum and purified by reprecipitating twice. The bound polyethoxylated content was determined by using NMR. The five experimental monomers are set out in Table II.

TABLE II
Polyethoxylated Monomer Derivatives Studied

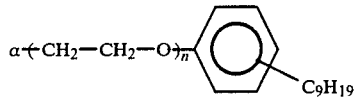

| α | n | Designation |
|---|---|---|
| 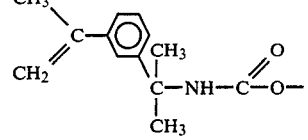 | 10 | α-MSC |
| 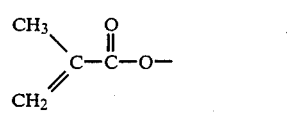 | 10 | Methacrylate |
| 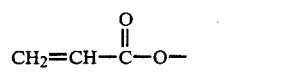 | 9 and 10 | Acrylate$_9$ & $_{10}$ |
| 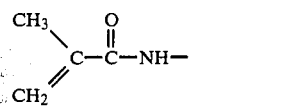 | 10 | Methacrylamide |

The potential copolymerizability of the various monomeric derivatives was assessed by examination of the reactivity ratios of representative chemical analogues with styrene and butadiene. The relative affinity of a monomeric radical to react with its own monomer as compared to the other monomer is reflected in the value of its respective reactivity ratio. A reactivity ratio of much less than 1.0 indicates the derivative radical nearly exclusively preferred to add the other monomer. This results in the derivative being incorporated as isolated islands of one incorporated unit amid sequences of incorporated units of the other monomers. Since the length of these sequences is dependent on the magnitude of the reactivity ratio of the other monomer, the ability of a derivative to be quantitatively incorporated during copolymerization may be estimated by comparing the size of its reactivity ratio with that of the other monomers.

From a study of the literature reactivity ratios for chemical analogues representing the double bonds of the various functional polyethoxylated monomers, it can be seen that the ratios of the analogues are all considerably larger for copolymerizations with styrene than butadiene. Thus, incorporation of the polyethoxylated monomers would be expected to be better in terpolymerizations with styrene and butadiene than copolymerizations with butadiene alone.

This premise is borne out by the results displayed in Table III.

TABLE III
Polyethoxylated Monomer Incorporation in an Emulsion Butadiene Polymerization

| Derivative Designation | % Conversion | Wt % Incorporated Derivative |
|---|---|---|
| α-MSC | 37 after 360 min. | 2.1 |
| α-MSC | 77 after 720 min. | 4.5 |
| Methacrylate | 33 after 360 min. | 7.8 |

Monomer Charge = 16% Polyethoxylated Monomer, 84% Butadiene
Polymerization Temperature = 10° C.
Surfactant = 2.7 pphm potassium soap of disproportionated rosin + 2.0 pphm Na salt of hydrogenated mixed fatty acids Table III shows that both the α-MSC and the methacrylate derivative were only partially incorporated in copolymerizations with butadiene. Additional experiments determined that the relative amount of incorporated methacrylate increased from less than 50% to quantitative levels as styrene was added to the charge. Quantitative incorporation of the polyethoxylated methacrylate monomer occurred with monomer charges containing greater than 25 pphm styrene under the polymerization conditions listed.

The two acrylate derivatives and the methacrylamide were examined as to their terpolymerizability in 66/21.5/12.5 butadiene/styrene/polyethoxylated monomer charges. The acrylate containing nine ethyleneoxide units per molecule was quantitatively incorporated. Unfortunately, the acrylate containing 30 ethyleneoxide units per molecule only incorporated at 30% of its original charge while the methacrylamide failed to incorporate at all under these conditions. The poor incorporation of the acrylate containing 30 ethyleneoxide units can be rationalized on the basis that the higher ethyleneoxide content imparted a much greater water solubility to the monomer. The monomer preferentially partitions into the water phase and is therefore less accessible to the polymerization loci particles. The complete absence of methylacrylamide incorporation may indicate unfavorable reactivity ratios exist at 10° C.; however, other reaction conditions would provide for its incorporation.

The complexity of copolymerizing amphiphilic monomers/polyethoxylated monomers in emulsion polymerizations has been disclosed. Because the monomers are surfactants, they position themselves at the particle water interface with the alkylphenol portion in the particle and the ethyleneoxide block in the aqueous phase. The copolymerizable functional group is located at the end of the polyethyleneoxide block and must enter the particle to participate in the polymerization.

EXPERIMENT 3

The ability of a polyethoxylated methacrylate monomer containing a nonylphenol group to incorporate in copolymerizations with butadiene or with butadiene/styrene mixtures was further examined. This experiment details the effects of polymerization temperature and surfactant on incorporation efficiency. The polymerizations and resulting analysis for bound polyethoxylated methacrylate content were conducted as described in Experiment 2. As set out in Experiment 2, the nature of the polymerizable function was found to be important, i.e. acrylate and methacrylate moieties incorporated essentially quantitatively, provided the monomer charge contained greater than 25 pphm of styrene. This experiment details the effect of some other experimental variables on the incorporation of polyethoxylated methacrylate monomer into either polybutadiene or SBR.

A styrene-butadiene-polyethoxylated methacrylate terpolymerization was conducted as described in Experiment 2 for various periods and the resulting polymers were analyzed for bound polyethoxylate content. The results revealed that the polyethoxylated monomer incorporation was invariant with conversion over the range of 50-80%.

Normally, in emulsion copolymerizations between styrene and butadiene, only minor changes in the bound styrene content of the copolymer occur over the course of the reaction. However, the constant incorporation level of an amphiphilic monomer with conversion in an emulsion polymerization is somewhat surprising. The amphiphilic monomer positions itself at the particle water interface, and incorporation should be favored at low conversions when the particle diameters are minimal and surface to volume ratios at the maximum.

The incorporation of polyethoxylated methacrylate in polybutadiene and SBR as a function of polymerization temperature was investigated. It was determined for SBR that minimal incorporation was observed between approximately 3° and 12° C.

It has also been determined that monomer incorporation decreases with increasing amounts of the soap sodium dodecylbenzenesulfonate. No effect on incorporation was seen up to 2 pphm added surfactant; however, higher levels caused the polyethoxylated monomer incorporation to fall off. Generally, the lowest level of surfactant that provides latex stability should be utilized. Other surfactants were examined, and the results are displayed in Table IV.

TABLE IV

Monomer Incorporation in Terpolymerizations Employing Various Added Surfactants[a]

| Added Surfactant (phm) | Analysis Terpolymer Content (%) by weight | | |
|---|---|---|---|
| | Methacrylate | Styrene | Butadiene |
| None | 11.1 | 13.4 | 74.9 |
| Sodium Dodecylbenzene sulfonate (0.875) | 9.5 | 15.6 | 74.9 |
| Cetyldimethylbenzyl-ammonium chloride (0.875) | 8.1 | 13.9 | 78.0 |
| Mixed 50/50 Na/K salt of fatty acid (2.5) | 13.8 | 6.4 | 79.8 |
| Na⊕/K⊕ fatty acid salt (2.0) K⊕ rosin acid salt (2.7) | 7.0 | 15.5 | 77.5 |

[a]Monomer charge ratio:
Styrene = 21.8%
Butadiene = 65.7%
Methacrylate = 12.5%
Polymerization temperature = 17° C.

As can be seen, various types of surfactants have differing effects on polyethoxylated monomer incorporation. The bound methacrylate content of SBR terpolymers prepared under identical conditions (except for surfactant) decreased in the order Na/K fatty acid salt no added surfactant (methacrylate functions as surfactant) sodium dodecyl benzene sulfonate cetyl dimethylbenzyl ammonium chloride. The use of 2.7 pphm of the K⊕ salt of rosin acid and 2.0 pphm of the mixed Na⊕/K⊕ fatty acid salt substantially reduced methacrylate incorporation.

Added surfactant may affect methacrylate incorporation by hindrance of the diffusion of the methacrylate function into the particle. The methacrylate group, located at the end of the hydrophilic poly(ethylene oxide) block must diffuse into the polymerizing latex particle in order to participate in the polymerization. If steric inhibition existed on the particle surface (e.g. by high surfactant density or bulk) the entry of the much larger methacrylate into the particle could be suppressed relative to that of the other monomers present.

Steric bulkiness is a likely explanation for the low levels of methacrylate incorporation observed with cetyl dimethylbenzyl-ammonium chloride (a quaternary ammonium salt containing two large substituents) and the salt of rosin acid (a rigid, carboxyl containing polycyclic). The mixed Na/K fatty acid salt is a mixture of several linear long chain carboxylic acids while sodium dodecyl benzene sulfonate contains a single benzene ring which makes it intermediate between the fatty acid salts and the bulky surfactants. As can be seen from Table IV the level of incorporation correlates quite well with surfactant bulkiness.

EXPERIMENT 4

Rubber to Wire Adhesion Study

Prior studies on the use of non-bound nonionic surfactants as cure activators had determined that inclusion in rubber formulation was detrimental to both original and aged rubber/wire adhesion. To determine if the polymer bound moieties would result in the same problem, the following study was conducted.

A polymer containing 19 pphr bound nonylphenoxypoly(ethyleneoxy)9ethanol (acrylate monomer) 11.2 pphr styrene, 69.8 pphr butadiene was methanol coagulated and acetone extracted to remove unreacted monomers and was blended with a wire coat stock according to Table V to yield a composition containing 5 pphr bound nonionic surfactant moiety.

TABLE V

Test Stock Used For Rubber/Wire Adhesion and Rubber/Cord Adhesion Evalution Parts By Weight

| Compound | I | II | III |
|---|---|---|---|
| Natural Rubber | 37 | 37 | 37 |
| Polyisoprene | 37 | 37 | 37 |
| SBR 1502 | 26 | — | 26 |
| SBR Polymer containing 19% bound acrylate9 | — | 26 | — |
| Unbound Nonylphenoxypoly (ethyleneoxy)9 ethanol | — | — | 5 |
| Oil | 2 | 2 | 2 |
| Carbon Black | 60 | 60 | 60 |
| Resin | 6 | 6 | 6 |
| Antioxidant | 0.75 | 0.75 | 0.75 |
| Sulfur | 3 | 3 | 3 |
| Accelerator | 1.2 | 1.2 | 1.2 |

For comparison, a composition containing no cure activator (no blending, wire coat stock only) and one with 5 pphr of unbound nonylphenoxypoly(ethyleneoxy)ethanol were prepared and evaluated in the wire adhesion test.

Physical testing of the samples indicated that the non-bound material adversely affected Mooney scorch (dropped from 18.6 min to 14 min), and rubber/wire adhesion.

Relative to the control that contained no cure activator, the bound and non-bound samples exhibited cure reduction of 27 and 24.5% respectively. Unexpectedly, however, Mooney scorch increased 6.4% for the bound sample, while for the unbound sample it dropped 36%. Thus, the bound nonionic surfactant moiety provided enhanced processing safety.

Rubber/wire adhesion for the control (no cure activator) and the sample with the bound activator were found comparable under both original and aged conditions while the sample containing unbound nonionic surfactant nonylphenoxypoly(ethyleneoxy)ethanol showed a dramatic decrease in rubber/wire adhesion (failure).

EXPERIMENT 5

Rubber to Cord Adhesion Study

Using the test formulation of Table V, polyester and polyaramide tire cords were embedded in rubber blocks and cured to $T_{90\%}$ or $2T_{90\%}$ cure states. Original and aged samples (14 days at 70° C.) were tested for rubber cord adhesion by measuring the force (newtons) necessary to pull the tire cord from the rubber block.

| Measured Pullout Force in Newtons at Room Temperature | | | |
|---|---|---|---|
| | I | II | III |
| | Compounds from Table V | | |
| $T_{90\%}$ Cured at 150° C., Original Unaged | | | |
| Polyester Cord | 185 | 230 | 175 |
| Polyaramide Cord | 170 | 190 | 175 |
| $2T_{90\%}$ Cured at 150° C., Original Unaged | | | |
| Polyester Cord | 190 | 230 | 170 |
| Polyaramide Cord | 185 | 200 | 190 |
| $T_{90\%}$ Cured at 150° C., Aged 14 days at 70° C. | | | |
| Polyester Cord | 245 | 300* | 205 |
| Polyaramide Cord | 170 | 225 | 180 |
| $2T_{90\%}$ Cured at 150° C., Aged 14 days at 70° C. | | | |
| Polyester Cord | 240 | 290* | 180 |
| Polyaramide Cord | 180 | 240 | 215 |

*Cord failure

Rubber/cord adhesion values show that the SBR polymer containing 19% bound acrylate$_9$ unexpectedly improves rubber/cord adhesion compared to the control or the compound containing unbound nonylphenoxypoly(ethyleneoxy)ethanol.

EXPERIMENT 6

Latices prepared in a manner similar to Experiment 2 were prepared containing 13.5, 19, 26.2, 39.7 and 50.5 pphr polymer bound acrylate$_9$ of Table III. These latices were mixed with a diluting SBR latex (23% styrene and 67% butadiene) to give a blended latex composition containing 7 pphr polymer bound acrylate$_9$. In each case the dry rubber was compounded using a simple recipe as shown in Table VI to investigate cure activating properties.

TABLE VI

| Test Stock Used For Polymer Bound Cure Activation Evaluation Parts By Weight | |
|---|---|
| Polymer containing 7 pphr bound acrylate$_9$ | 100 |
| Carbon Black (N-660) | 20 |
| Stearic Acid | 2 |
| Antiozonant | 1 |
| Aromatic Oil | 30 |
| ZnO | 3 |
| Sulfur | 1.6 |
| 4-morpholinyl-2-benzothiazole disulfide | 1.0 |
| Tetramethylthiuram disulfide | 0.15 |

(↑ non-productive mix / ↓ productive mix)

A control stock was also prepared as in Table VI which was only SBR. The samples were cured at 149° C. and the stocks containing 7 pphr of bound acrylate$_9$ exhibited from 20 to 36% reduction in cure times. All the samples were cured to approximately the same cure state as indicated by rheometer torque values.

INDUSTRIAL APPLICABILITY

The instant invention provides decreased cure times which, in the production of tires, hoses and belts, can have a beneficial impact on production rates and energy requirements. The bound cure activator of this invention does not adversely affect rubber/wire adhesion or final physical properties of the vulcanizate. Other benefits derived from the use of the materials of this invention will be obvious to those skilled in the art.

We claim:

1. A vulcanizable rubber composition comprising rubber, a vulcanizing agent and a polymeric cure activator, wherein said polymeric cure activator is prepared in a free radical emulsion polymerization wherein at least one polyethoxylated monomer of the following structural Formula I:

$$\alpha\text{—O—CH}_2\text{—CH}_2\text{—O})_n\beta \qquad \text{Formula I}$$

wherein $\alpha$ is a radical selected from the group consisting of:

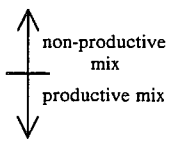

wherein R may be methyl or hydrogen;
n may vary from 2 to 30;

m may vary from 1 to 10 with the proviso that n is always greater than m;

and wherein β is selected from the group consisting of:

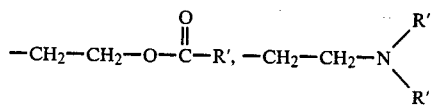

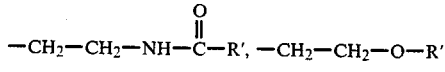

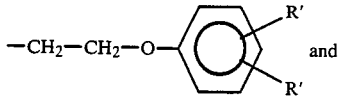

wherein R' is an alkyl radical of 1–20 carbon atoms or hydrogen;

is polymerized with at least one co-monomer selected from the group comprising styrene, α-methylstyrene, butadiene, isoprene, methylbutadiene, dimethylbutadiene, pentadiene and chloroprene.

2. A polymeric composition for enhancing the vulcanization of a sulfur vulcanizable rubber, wherein said polymeric composition consists essentially of segmeric units, a portion of said units consisting of polyethoxylated segmeric units having the structural formula:

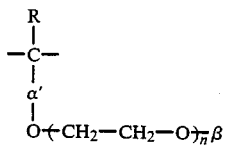

wherein n may vary from 2 to 30;

wherein α' is a divalent radical selected from the group comprising:

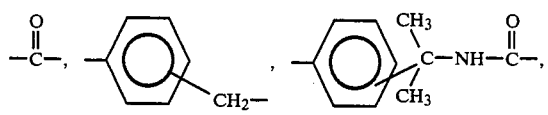

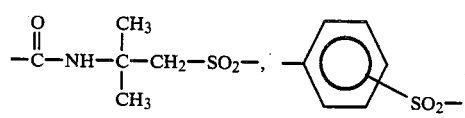

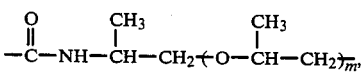

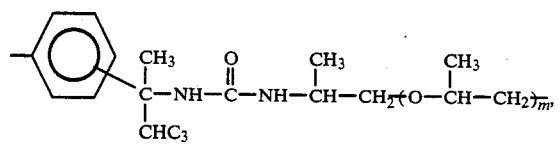

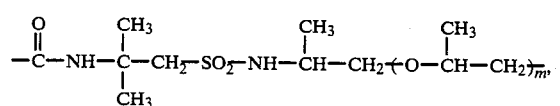

and

-continued

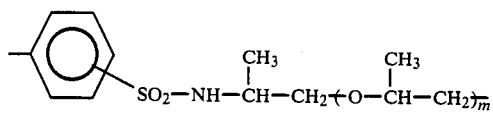

wherein R may be a hydrogen or a methyl radical;

n may vary from 2 to 30;

m may vary from 1 to 10 with the proviso that n is always greater than m; and

β is selected from the group comprising:

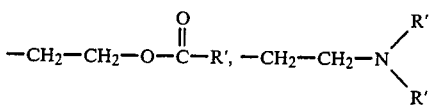

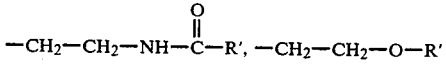

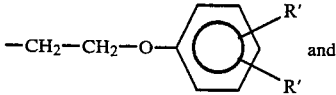

wherein R' is an alkyl radical of 1–20 carbon atoms or hydrogen.

3. A vulcanizable rubber composition comprising rubber, a vulcanizing agent and filler, the improvement which is characterized by incorporating into the rubber composition an effective vulcanization promoting amount of a cure activating polymeric composition prepared by polymerizing in a free radical polymerization system, a monomer system containing at least one polyethoxylated monomer having the structural formula I:

$$\alpha\text{—O—CH}_2\text{—CH}_2\text{—O})_n\beta \quad (I)$$

wherein α is a radical selected from the group consisting of:

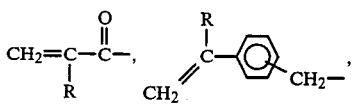

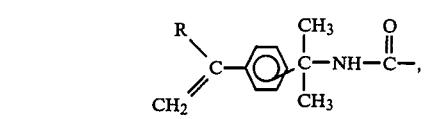

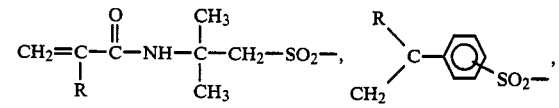

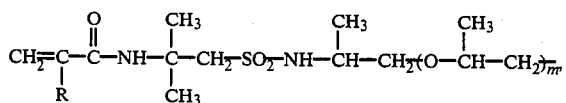

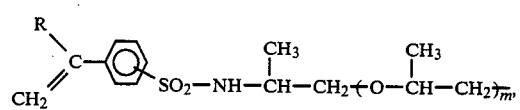

-continued

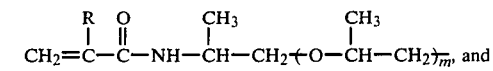

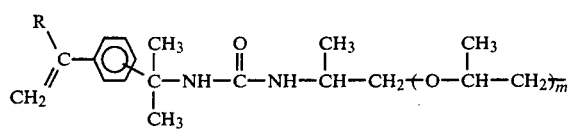

wherein R may be methyl or hydrogen;
n may vary from 2 to 30;
m may vary from 1 to 10 with the proviso that n is always greater than m;
and wherein β is selected from the group consisting of:

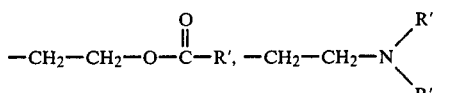

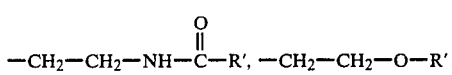

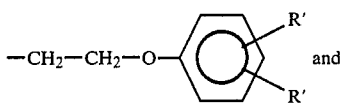

$-CH_2-CH_2-S-R'$;

wherein R' is an alkyl radical of 1-20 carbon atoms or hydrogen.

4. The vulcanizable rubber composition according to claim 1 wherein α is the radical:

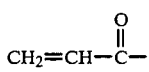

β is the radical:

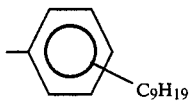

n is 9 and the comonomers are styrene and butadiene.

5. The polymeric composition according to claim 2 wherein segmers of styrene and butadiene are present.

6. The vulcanizable rubber composition according to claim 3 wherein 25 pphm of the monomer system is styrene so as to achieve essentially quantitative incorporation of the polyethoxylated monomer.

7. The vulcanization promoting composition prepared according to claim 3 characterized in that it is blended with a compatible polymer and at levels that activate cure.

8. The vulcanization promoting composition prepared according to claim 3 wherein α is the radical:

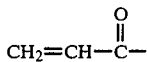

β is the radical:

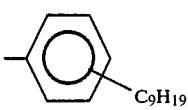

n is 9, the monomer system comprises styrene and butadiene;
characterized in that it is blended with a compatible SBR polymer at levels that activate the rate of cure of the blend.

9. The polymeric composition for enhancing the vulcanization of a vulcanizable rubber of claim 2 wherein the polyethoxylated segmer is grafted onto a vinylbenzylchloride containing polymer.

* * * * *

UNITED STATES PATENT AND TRADEMARK OFFICE
CERTIFICATE OF CORRECTION

PATENT NO. : 4,579,911

DATED : April 1, 1986

INVENTOR(S) : D'Sidocky et al

It is certified that error appears in the above-identified patent and that said Letters Patent is hereby corrected as shown below:

At Col. 2, line 50 delete "$\alpha-O-CH_2-CH_2-O)_{n\beta}$ Formula I" and insert therefor:

-- $\alpha-O-(CH_2-CH_2-O)_{n\beta}$ Formula I --

At Col. 13, lines 58 and 59 delete "salt no added surfactant (methacrylate functions as surfactant) sodium dodecyl benzene sulfonate cetyl di-" and insert therefor:

--salt > no added surfactant (methacrylate functions as surfactant) > sodium dodecyl benzene sulfonate > cetyl di- --

At Col. 16, line 25 delete "$\alpha-O-CH_2-CH_2-O)_{n\beta}$ Formula I" and insert therefor:

-- $\alpha-O-(CH_2-CH_2-O)_{n\beta}$ Formula I --

At Col. 18, line 42 delete "$\alpha-O-CH_2-CH_2-O)_{n\beta}$ (I)" and insert therefor:

-- $\alpha-O-(CH_2-CH_2-O)_{n\beta}$ (I) --

Signed and Sealed this

Ninth Day of December, 1986

Attest:

DONALD J. QUIGG

Attesting Officer     Commissioner of Patents and Trademarks